(12) United States Patent
Huber et al.

(10) Patent No.: US 7,540,550 B1
(45) Date of Patent: Jun. 2, 2009

(54) VEHICLE BODY STRUCTURE

(75) Inventors: Matthew Huber, Novi, MI (US); Ryuu Sano, Kanagawa (JP)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 12/040,621

(22) Filed: Feb. 29, 2008

(51) Int. Cl.
*B60J 7/00* (2006.01)
(52) U.S. Cl. .................... 296/29; 296/193.09; 296/198; 293/120
(58) Field of Classification Search ............ 296/29, 296/203.02, 198, 193.09
See application file for complete search history.

(56) References Cited

U.S. PATENT DOCUMENTS

| 5,029,920 | A | 7/1991 | Furuta et al. |
| 7,207,617 | B2 | 4/2007 | Pelini |

*Primary Examiner*—Joseph D Pape
(74) *Attorney, Agent, or Firm*—Global IP Counselors, LLP

(57) ABSTRACT

A vehicle body structure is provided with a bumper fascia panel with a bumper fascia mounting flange, a fender body panel with a fender mounting flange and a mounting flange attachment that secures the mounting flanges together. The mounting flange attachment arrangement has a first fastening member overlying the bumper fascia mounting flange, a second fastening member overlying the fender mounting flange and a fastening element coupling the first and second fastening members together. The bumper fascia mounting flange and the fender mounting flange are sandwiched between the first and second fastening members. The fastening element has a tool engagement portion located on an inboard side of the mounting flange attachment and a center fastening axis angled in an inboard direction of the vehicle body structure.

16 Claims, 20 Drawing Sheets

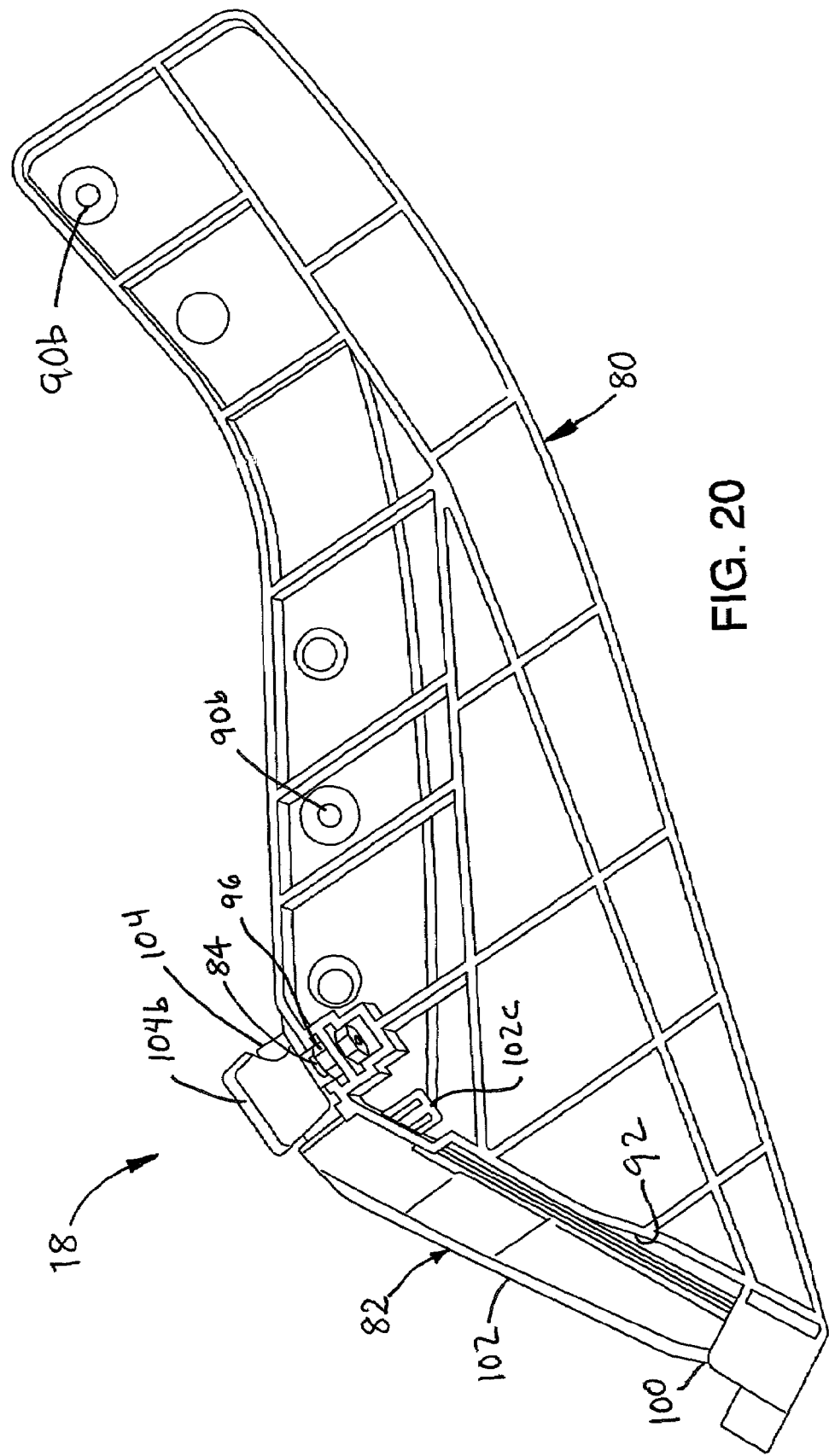

US 7,540,550 B1

VEHICLE BODY STRUCTURE

BACKGROUND OF THE INVENTION

1. Field of the Invention

The present invention generally relates to a vehicle body structure. More specifically, the present invention relates to a vehicle body structure, which utilizes a mounting bracket arrangement for attaching a bumper fascia panel to a fender body panel so as to form a smooth transition between the exterior surfaces of the panels.

2. Background Information

For many years, automotive vehicles have been provided with front and rear bumpers to cushion the vehicle in the event of an impact. Also, for many years, automotive vehicles have been provided with numerous body and/or fascia panels coupled thereto to form the outer shell of the vehicle body. In recent years, it has been desirable to make vehicles with a smooth exterior shape, in which the bumpers are integrated with the overall shape of the vehicle body. Thus, in recent years, bumpers have often been provided with a bumper fascia panel mounted to the bumper that extends across the bumper and wraps around the corners of the bumper. Fender panels are often attached to the ends of the bumper fascia panels in a relatively smooth manner to integrate the bumpers into the overall outer shape of the vehicle body. Typically, the bumper fascia panel and the fender panel have mounting flanges that mate together with a plurality of nuts and bolts securing the flanges together. For example, one such arrangement is disclosed in U.S. Pat. No. 5,029,920 in which fender panels are attached to a front bumper fascia using a plurality of nuts and bolts. Also, more recently, a mounting bracket has been proposed that aids in the assembly process by increasing the effective width of the mounting flange on the fender (see, U.S. Pat. No. 7,207,617). While these conventional structures work well in most applications, they can not be effectively used in tight areas in which the vehicle body has an aggressive body style in which the seams between the body panels are located at small, tight areas. In other words, a good fit and finish between the panels may not always be possible with these conventional structures.

In view of the above, it will be apparent to those skilled in the art from this disclosure that there exists a need for an improved vehicle body structure. This invention addresses this need in the art as well as other needs, which will become apparent to those skilled in the art from this disclosure.

SUMMARY OF THE INVENTION

One object of the present invention to provide a vehicle body structure in which a good fit and finish is attained for mating a bumper fascia panel and a fender body panel together.

In view of the foregoing object, a vehicle body structure is provided that basically comprises a bumper fascia panel, a fender body panel and a mounting flange attachment. The bumper fascia panel includes an interior bumper fascia surface, an exterior bumper fascia surface and a bumper fascia mounting flange. The bumper fascia mounting flange extends from the exterior bumper fascia surface at an angle to form a first exterior abutment edge between the exterior bumper fascia surface and a mounting surface of the bumper fascia mounting flange such that the first exterior abutment edge is visible from an exterior view of the vehicle body structure. The fender body panel includes an exterior fender surface and a fender mounting flange. The fender mounting flange extends from the exterior fender surface at an angle to form a second exterior abutment edge between the exterior fender surface and a mounting surface of the fender mounting flange such that the second exterior abutment edge is visible when installed. The mounting flange attachment arrangement has a first fastening member overlying the bumper fascia mounting flange, a second fastening member overlying the fender mounting flange and a fastening element coupling the first and second fastening members together with the bumper fascia mounting flange and the fender mounting flange being sandwiched between the first and second fastening members. The fastening element has a tool engagement portion located on an inboard side of the mounting flange attachment and a center fastening axis angled in an inboard direction of the vehicle body structure.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 20 is a bottom plan view of the mounting flange attachment arrangement with the fender attachment bracket attached to the bumper fascia stiffening bracket by a single bolt;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
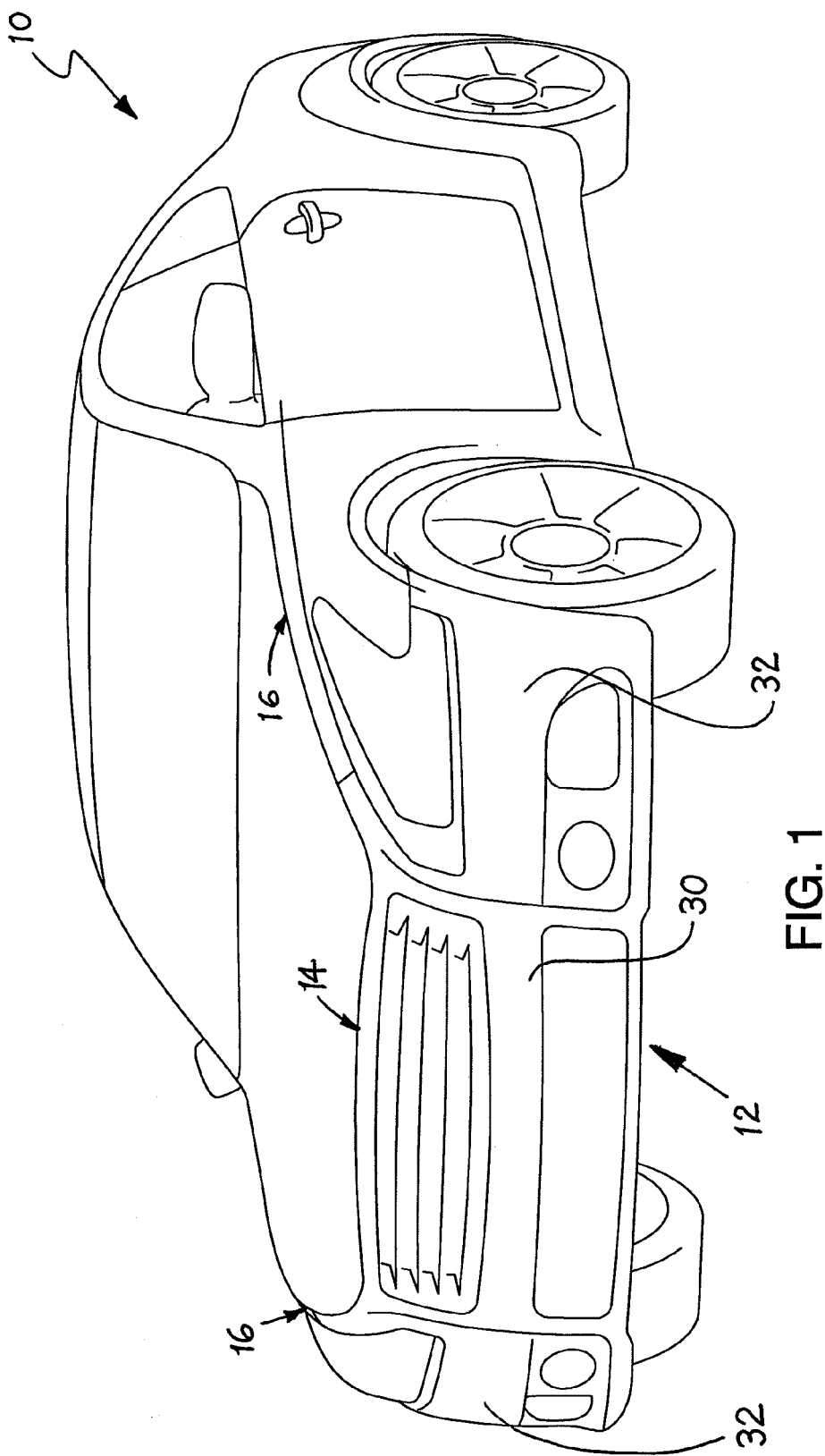
FIG. 1 is a front perspective view of a vehicle equipped with a vehicle front end body structure having a mounting flange attachment arrangement coupling a bumper fascia panel and to fender body panels in accordance with one embodiment.
Figure 2:
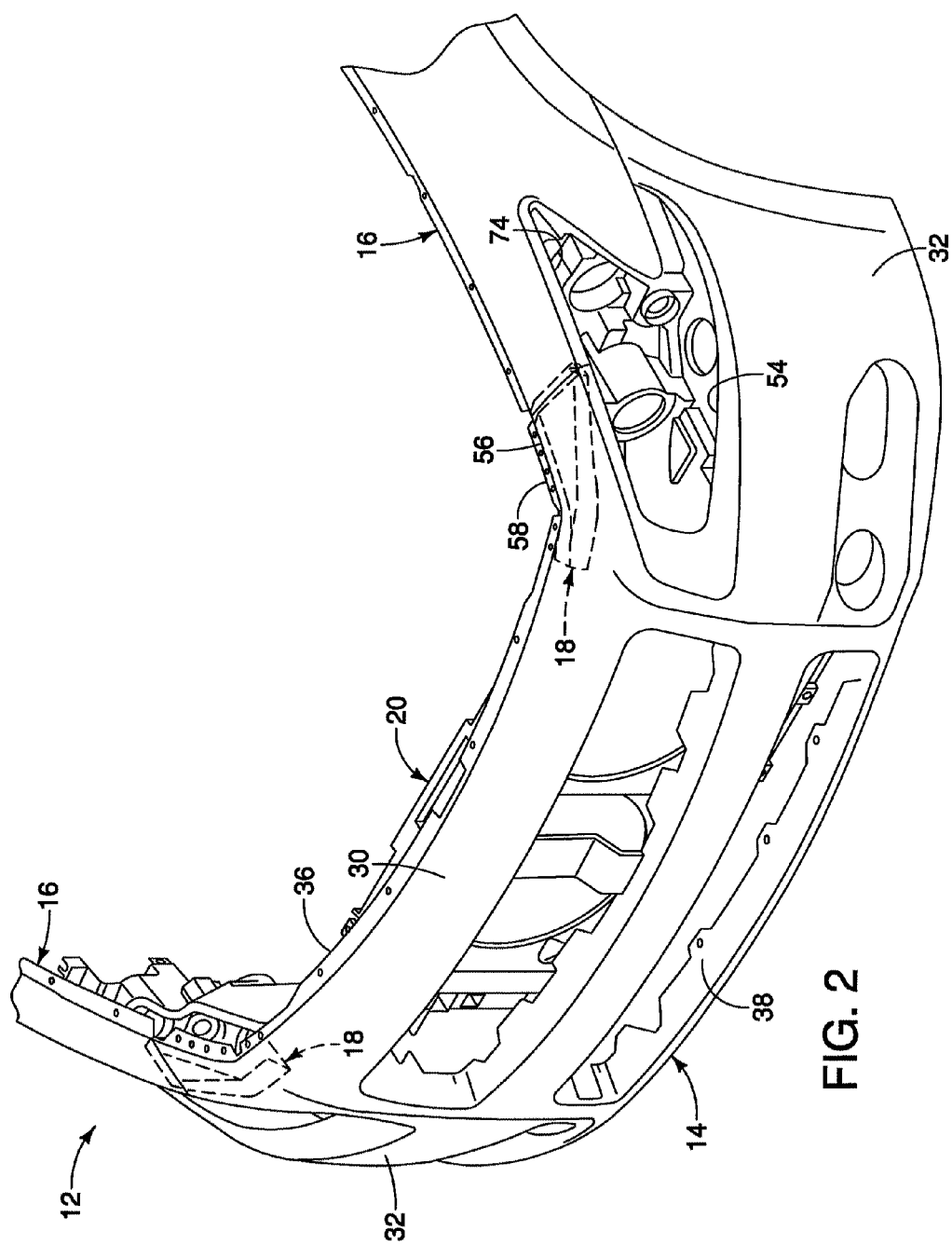
FIG. 2 is a partial front perspective view of selected parts of the vehicle body structure illustrated in FIG. 1 including the bumper fascia panel and one of the fender body panel.

Referring initially to FIGS. 1-4, an automotive vehicle 10 is illustrated with a vehicle front end body structure 12 in accordance with one embodiment. The vehicle 10 is conventional, except for the vehicle front end body structure 12 as described herein. Accordingly, the vehicle 10 and its various parts will not be discussed and/or illustrated in detail herein, except as related to the vehicle front end body structure 12. As seen in FIG. 2, the vehicle front end body structure 12 basically includes a bumper fascia panel 14, a pair of fender body panels 16 and a pair of mounting flange attachment arrangements 18. The flange attachment arrangements 18 are used to securely fasten upper parts of the bumper fascia panel 14 to the fender body panels 16 such that the bumper fascia panel 14 mates with the fender body panels 16 to form smooth seams therebetween (e.g., a high level of fit and finish). The flange attachment arrangements 18 also stiffen the upper parts of the bumper fascia panel 14 as discussed below. The left and right mounting flange attachment arrangements 18 are identical to each other, but for being mirror images of each other. Thus, only the left mounting flange attachment arrangements 18 will be illustrated herein.

The vehicle front end body structure 12 is configured to be fixedly attached to a main front bumper member (not shown) of the vehicle 10 to form part of a front bumper structure of the vehicle 10. However, even though the vehicle front end body structure 12 is illustrated at the front of the vehicle 10 in this embodiment, it will be apparent to those skilled in the automotive art from this disclosure can applied to the rear of a vehicle (i.e. the rear bumper) as needed and/or desired.

Figure 3:
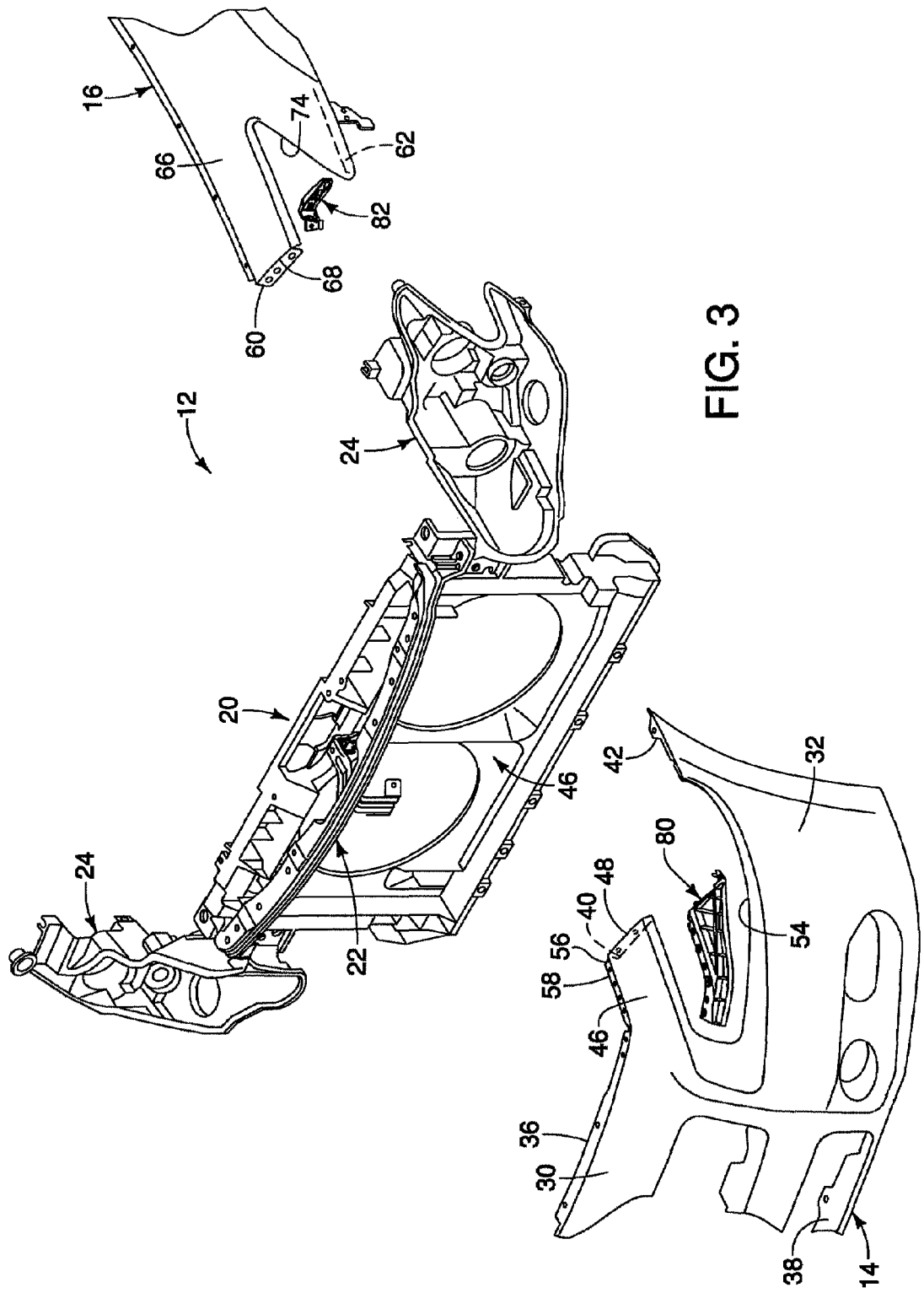
FIG. 3 is an exploded front perspective view of selected parts of the vehicle body structure illustrated in FIGS. 1 and 2.

As seen in FIG. 3, the vehicle front end body structure 12 also includes a radiator core support 20, an upper vehicle bumper fascia retainer 22 and a pair of head lamp housings 24 as well as other parts (not shown). The radiator core support 20 constitutes a main part of a vehicle front end module that supports the bumper fascia panel 14 via the upper vehicle bumper fascia retainer 22. The head lamp housings 24 are attached to the ends of the upper vehicle bumper fascia retainer 22. The constructions of the radiator core support 20, the upper vehicle bumper fascia retainer 22 and the head lamp housings 24 are not relevant to the connections between the bumper fascia panel 14 and the fender body panels 16 by the mounting flange attachment arrangements 18. Moreover, constructions of the radiator core support 20, the upper vehicle bumper fascia retainer 22 and the head lamp housings 24 vary depending upon the vehicle body styling as well as other design considerations. Thus, the radiator core support 20, the upper vehicle bumper fascia retainer 22 and the head lamp housings 24 will not be discussed in further detail.

Basically, as seen in FIGS. 1 and 2, the bumper fascia panel 14 is a one-piece, unitary member formed of a thin, lightweight sheet material such as a rigid plastic material (e.g., a thermoplastic olefin elastomer) or any other suitable material. In any case, the bumper fascia panel 14 should be constructed of a self supporting material with a degree of flexibility such that the bumper fascia panel 14 is flexible yet maintains its shape. The bumper fascia panel 14 covers a rigid bumper member (not shown). The bumper fascia panel 14 includes an elongated transverse portion 30, a pair of bent end portions 32.

As seen in FIG. 2, the elongated transverse portion 30 of the bumper fascia panel 14 has an upper transverse mounting flange 36 and a lower transverse mounting flange 38. The upper transverse mounting flange 36 is fastened to the upper vehicle bumper fascia retainer 22 by a plurality of fasteners (not shown) such as rivets. The lower transverse mounting flange 38 is fastened to a lower vehicle bumper fascia retainer (not shown), which is fixedly attached to the lower end of the radiator core support 20. The connections of the mounting flanges 36 and 38 are relevant to the use of the mounting flange attachment arrangements 18 to connect the bumper fascia panel 14 to the fender body panels 16, and thus, the connections of the mounting flanges 36 and 38 will not be discussed herein.

The bent end portions 32 are arranged at opposite ends of the transverse portion 30 such that the bumper fascia panel 14 has a wide, substantially U-shaped overall profile as viewed from above (FIG. 2). The bent end portions 32 are preferably mirror images of each other. Thus, for the sake of brevity, only one of the portions 32 will be discussed and illustrated in detail herein. However, it will be apparent to those skilled in the automotive art from this disclosure that the descriptions and illustrations apply to both of the portions 32.

Each of the bent end portions 32 of the bumper fascia panel 14 has an upper bumper fascia mounting flange 40 for connecting to a first part of one of the fender body panels 16, and a lower bumper fascia mounting flange 42 for connecting to a second part of one of the fender body panels 16. The upper bumper fascia mounting flange 40 is fastened to the first part of one of the fender body panels 16 by the mounting flange attachment arrangement 18. The lower bumper fascia mounting flange 42 is fastened to the second part of one of the fender body panels 16 by one or more fasteners (not shown) such as with conventional body clips and screws. Since only the upper connections between the bumper fascia panel 14 and the fender body panels 16 use the mounting flange attachment arrangements 18, the lower connections between the bumper fascia panel 14 and the fender body panels 16 will not be discussed or illustrated herein for the sake of brevity.

Figure 4:
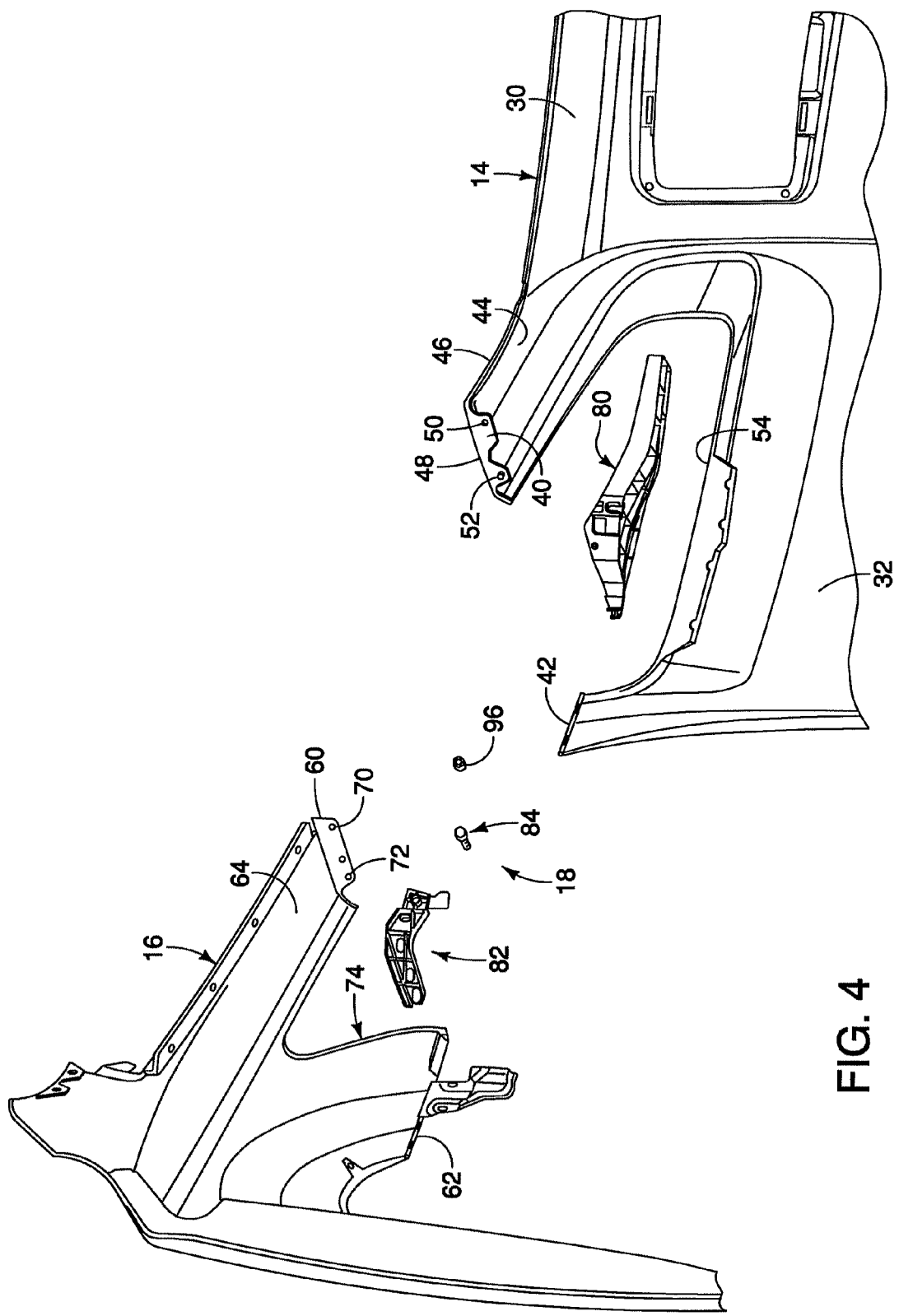
FIG. 4 is an exploded partial rear perspective view of selected parts of the left side of the vehicle body structure illustrated in FIGS. 1 to 3.
Figure 5:
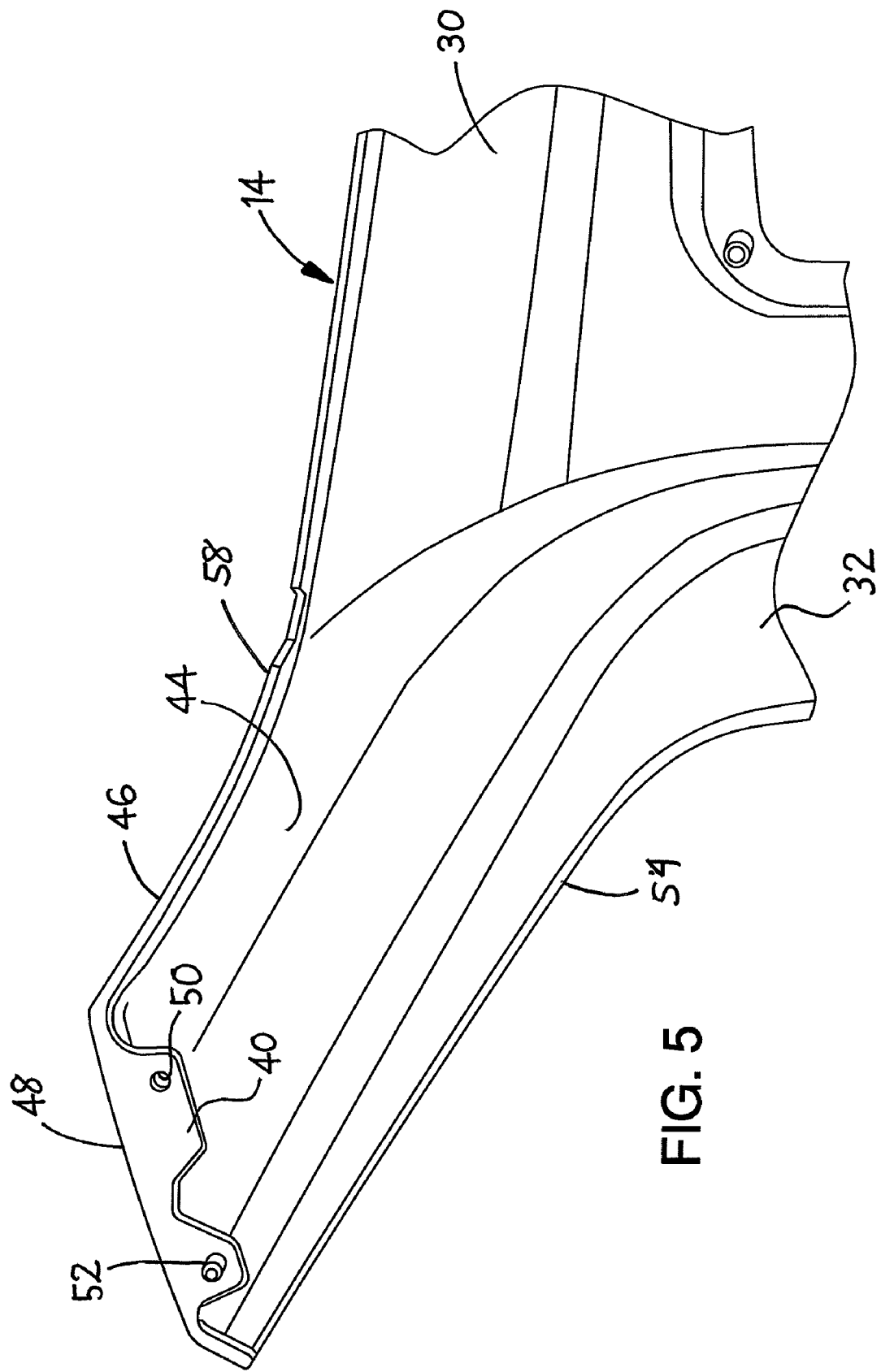
FIG. 5 is a partial rear perspective view of the left end of the bumper fascia panel of the vehicle body structure illustrated in FIGS. 1 to 4.
Figure 6:
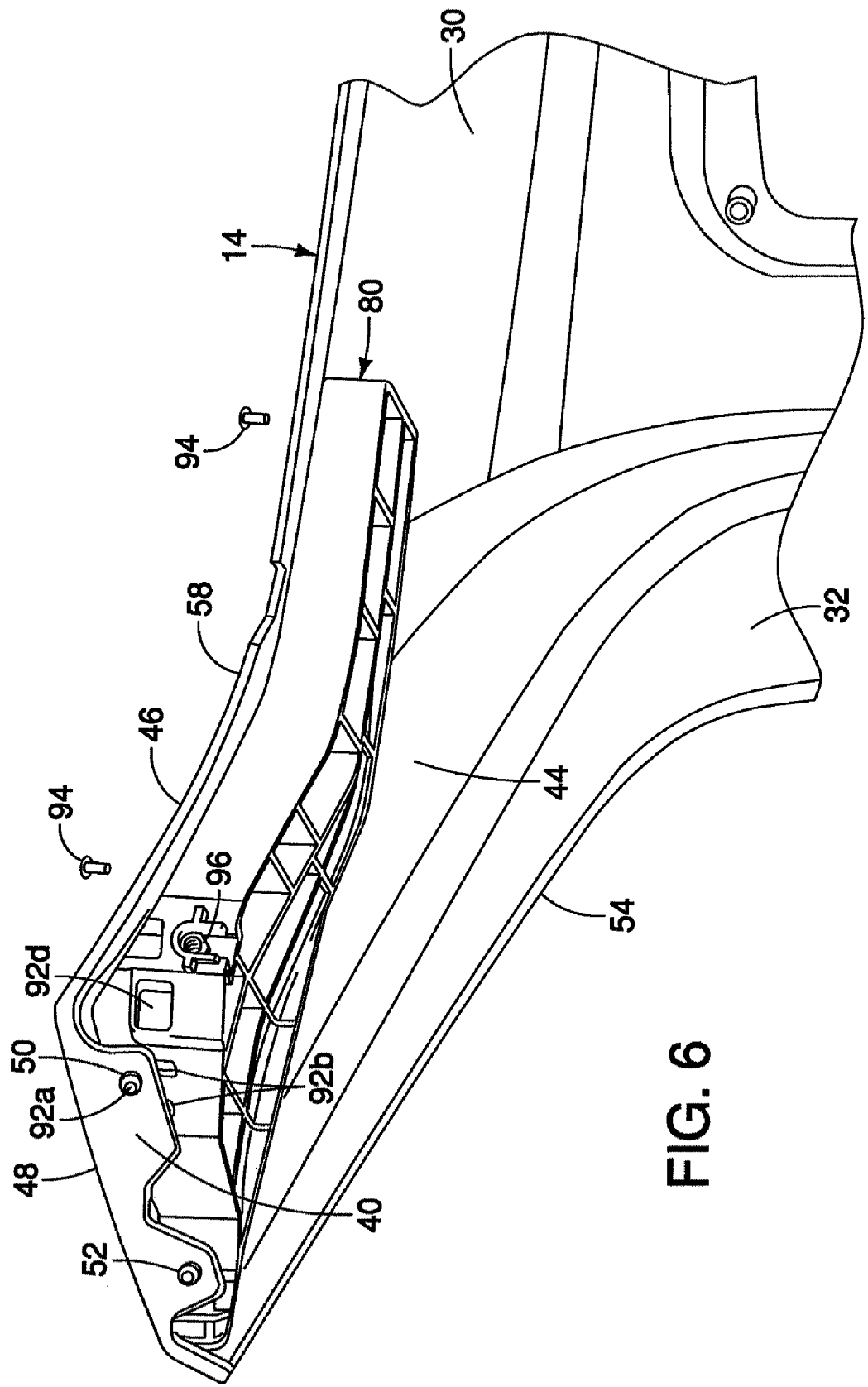
FIG. 6 is a partial rear perspective view of the left end of the bumper fascia panel of the vehicle body structure illustrated in FIG. 4, with the bumper fascia stiffening bracket being attached thereto.

As seen in FIGS. 4 to 6, the upper bumper fascia mounting flange 40 is bent to extend generally perpendicular to a contoured interior bumper fascia surface 44 of the bent end portion 32 to a free edge. Since the bent end portion 32 is formed of a thin sheet material, the bent end portion 32 has a contoured exterior bumper fascia surface 46 that follows the contoured interior bumper fascia surface 44. Thus, the upper bumper fascia mounting flange 40 extends from the contoured exterior surface 46 at an angle (generally perpendicular) to form an exterior abutment edge 48 between the contoured exterior surface 46 and a mounting surface of the upper bumper fascia mounting flange 40 such that the exterior abutment edge 48 is visible from an exterior view of the vehicle front end body structure 12 when connected to the fender body panel 16. The contoured exterior bumper fascia surface 46 mates with exterior fender surface of the fender body panels 16 to form a smooth seam therebetween when they are fixedly coupled together by using the mounting flange attachment arrangement 18. Preferably, the contoured interior and exterior surfaces 44 and 46 are curved as viewed in transverse cross-section with the contoured interior bumper fascia surface 44 being concaved and the contoured exterior bumper fascia surface 46 being convex.

As seen in FIGS. 4 to 6, the upper bumper fascia mounting flange 40 has a mounting hole 50 and a locating projection 52. The mounting hole 50 and the locating projection 52 cooperate with the mounting flange attachment arrangement 18 to provide proper alignment with the fender body panel 16 to ensure a good connection with a smooth transition between the exterior surfaces of the bumper fascia panel 14 and the fender body panel 16.

As seen in FIGS. 4 to 6, the bent end portions 32 of the bumper fascia panel 14 also includes an exterior head lamp edge 54 that defines a part of a head lamp opening, and an exterior hood edge 56 that defines a part of a hood opening. The exterior head lamp edge 54 extends between the bumper fascia mounting flanges 40 and 42. The exterior head lamp edge 54 also joins with the exterior abutment edge 48 to define at least an upper edge of a head lamp opening that is visible from the exterior view of the vehicle front end body structure 12. A mounting flange 58 extends inwardly from the exterior hood edge 56. The exterior hood edge 56 is visible from the exterior view of the vehicle front end body structure 12 when the hood is closed and the mounting flange 58 is not visible from the exterior view of the vehicle front end body structure 12 when the hood is closed.

The fender body panels 16 are preferably mirror images of each other. Thus, for the sake of brevity, only one of the fender body panels 16 will be discussed and illustrated in herein. However, it will be apparent to those skilled in the automotive art from this disclosure that the descriptions and illustrations of the fender body panel 16 apply to both of the fender body panels. Furthermore, it will be apparent to those skilled in the automotive art from this disclosure that the fender body panels 16 are attached to the mounting flange attachment arrangements 18 in identical manners, except they are attached in mirror image configurations.

Each of fender body panels 16 has an upper fender mounting flange 60 for connecting to one of the upper fender body mounting flanges 40, and a lower mounting flange 62 for connecting to one of the lower bumper fascia mounting flanges 42. The upper fender body mounting flange 60 is fastened to the upper bumper fascia mounting flange 40 by the mounting flange attachment arrangement 18. The lower fender body mounting flange 62 is fastened to the lower bumper fascia mounting flange 42 by one or more fasteners (not shown) such as with conventional body clips and screws.

As seen in FIGS. 4 to 6, the upper fender mounting flange 60 is bent to extend generally perpendicular to a contoured interior fender surface 64 of the fender body panel 16 to a free edge. Since the fender body panel 16 is formed of a thin sheet material, the fender body panel 16 has a contoured exterior fender surface 66 that follows the contoured interior fender surface 64. Thus, the upper fender mounting flange 60 extends from the contoured exterior surface 46 at an angle (generally perpendicular) to form an exterior abutment edge 68 between the contoured exterior surface 66 and a mounting surface of the upper fender mounting flange 60 such that the exterior abutment edge 68 is visible from an exterior view of the vehicle front end body structure 12 when the fender body panel 16 is connected to the bumper fascia panel 14. The contoured exterior fender surface 66 mates with contoured exterior bumper fascia surface 46 to form a smooth seam therebetween when they are fixedly coupled together by using the mounting flange attachment arrangement 18. Preferably, the contoured interior and exterior surfaces 64 and 66 are curved as viewed in transverse cross-section with the contoured interior fender surface 64 being concaved and the contoured exterior fender surface 66 being convex.

As seen in FIGS. 4 to 6, the upper fender mounting flange 60 has a first mounting hole 70 and a second mounting hole 72. The mounting holes 70 and 72 cooperate with the mounting flange attachment arrangement 18 to provide proper alignment of the fender body panel 16 with the bumper fascia panel 14 to ensure a good connection with a smooth transition between the exterior surfaces of the bumper fascia panel 14 and the fender body panel 16.

Also each of the fender body panels 16 also includes an exterior head lamp edge 74 that defines a part of a head lamp opening, and an exterior hood edge 76 that defines a part of a hood opening. The exterior head lamp edge 74 extends between the bumper fascia mounting flanges 60 and 62. The exterior head lamp edge 74 also joins with the exterior abutment edge 68 to define at least an upper edge of a head lamp opening that is visible from the exterior view of the vehicle front end body structure 12. The exterior head lamp edge 54 of the bumper fascia panel 14 and the fender body panel 16 of the exterior head lamp edge 74 meet together to completely encircle the head lamp opening.

Figure 16:
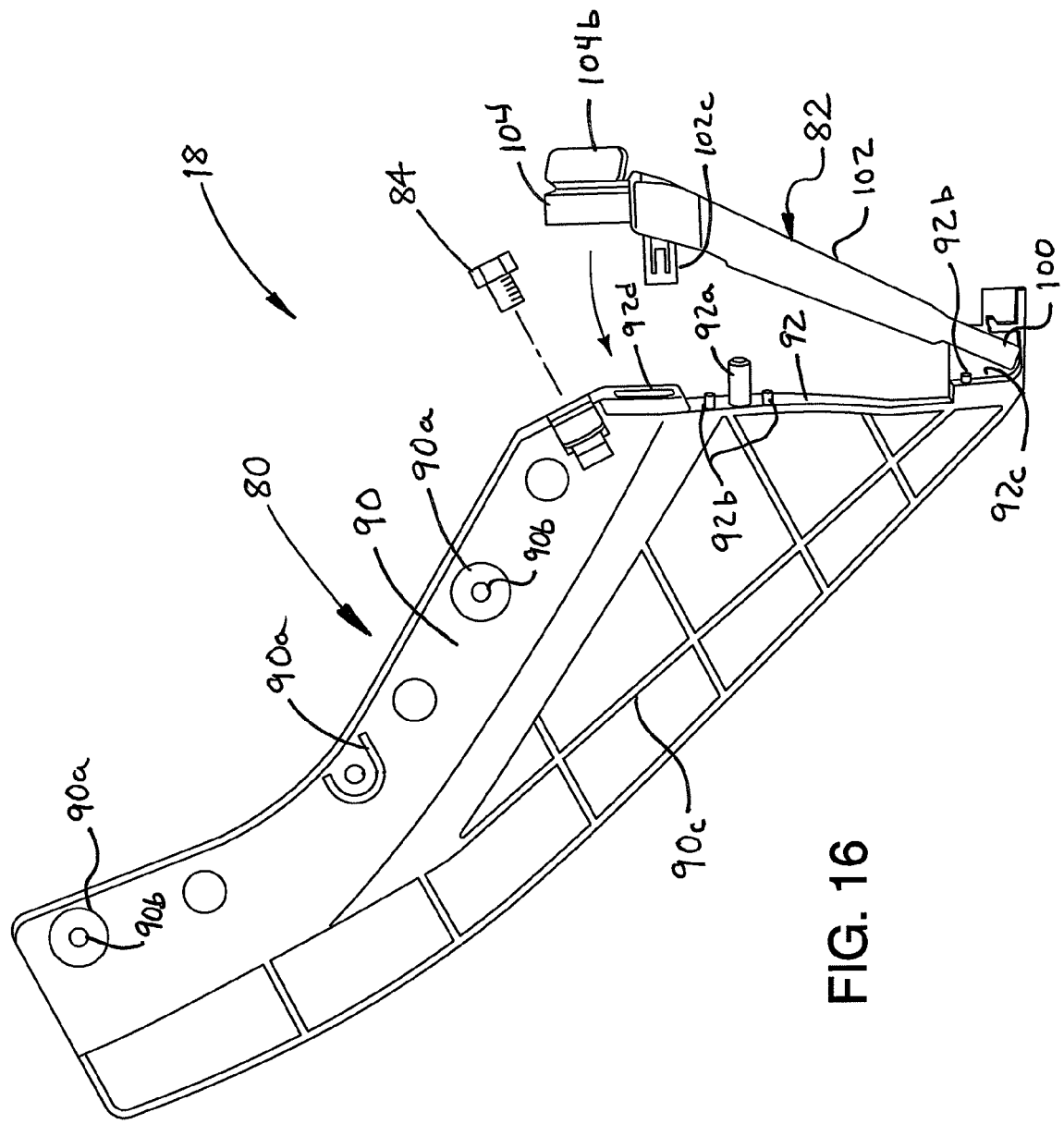
FIG. 16 is a top plan view of the fender attachment bracket of the mounting flange attachment arrangement in a process of being attached to the bumper fascia stiffening bracket of the mounting flange attachment arrangement.
Figure 17:
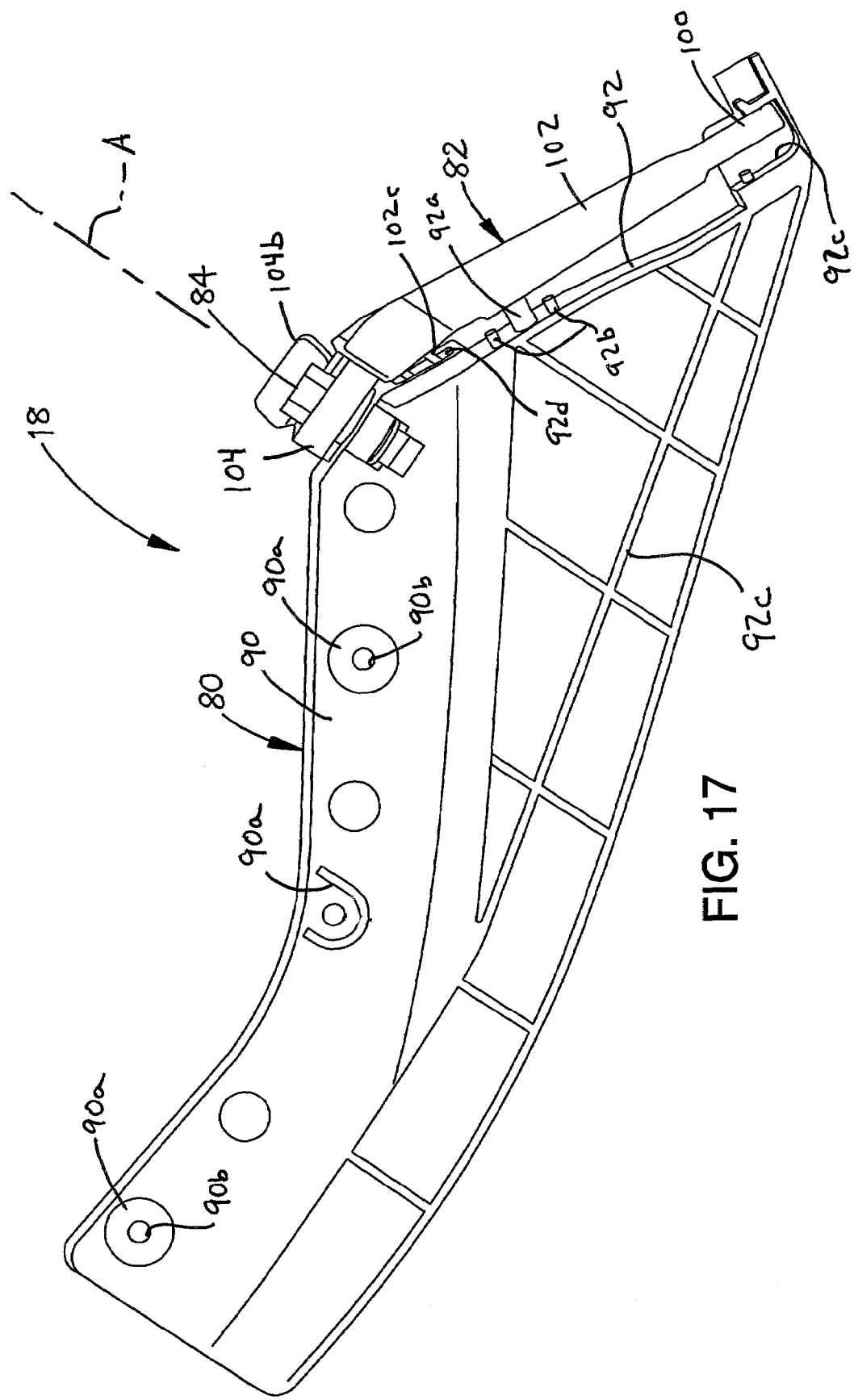
FIG. 17 is a top plan view of the mounting flange attachment arrangement with the fender attachment bracket attached to the bumper fascia stiffening bracket by a single bolt.
Figure 18:
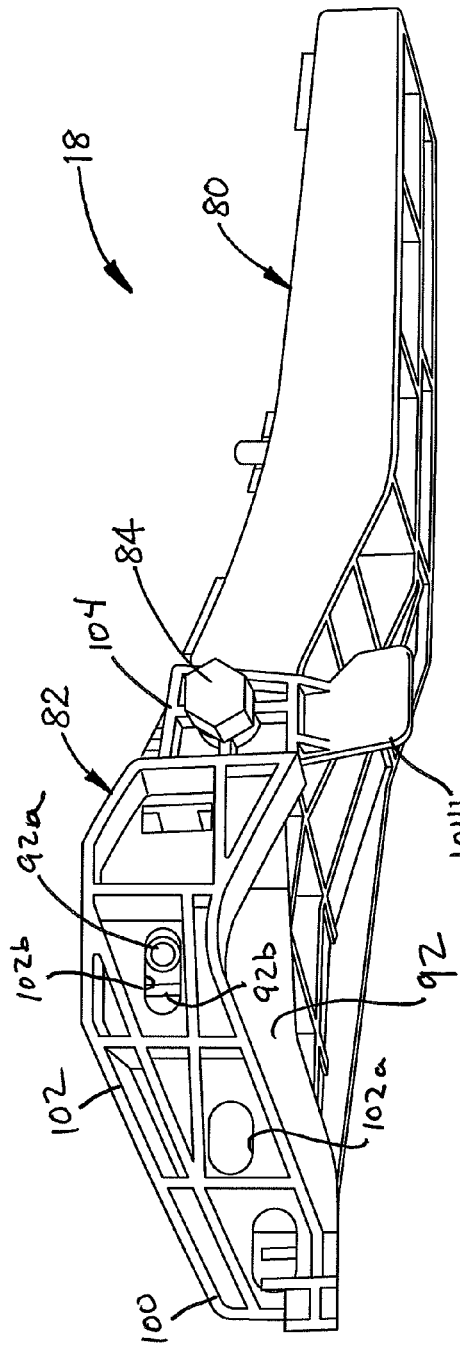
FIG. 18 is a rear perspective view of the mounting flange attachment arrangement with the fender attachment bracket attached to the bumper fascia stiffening bracket by a single bolt.
Figure 19:
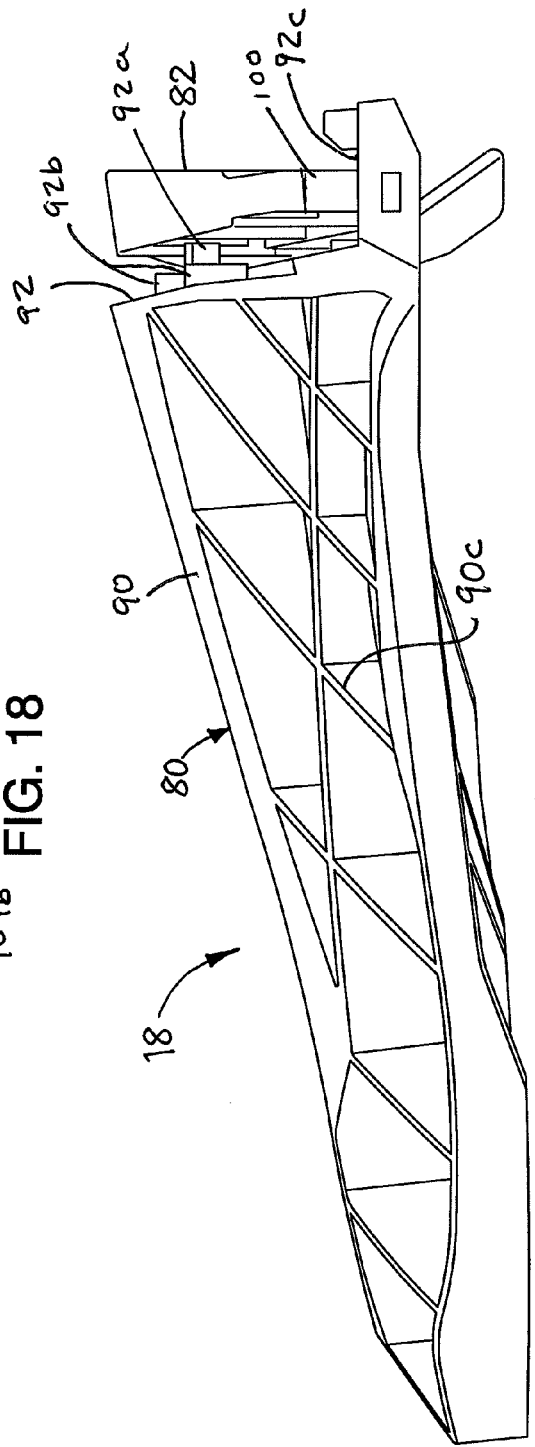
FIG. 19 is a outboard side perspective view of the mounting flange attachment arrangement with the fender attachment bracket attached to the bumper fascia stiffening bracket by a single bolt.
Figure 22:
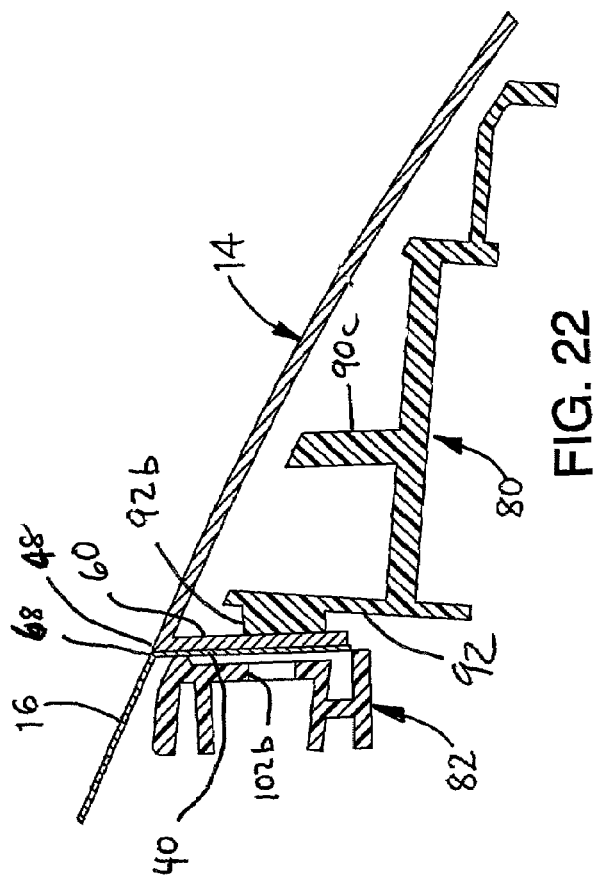
FIG. 22 is a simplified cross sectional view of the left end connection between the left end of the bumper fascia panel and the left fender body panel attached together by the mounting flange attachment arrangement as seen along section line 21-21 in FIG. 12.
Figure 21:
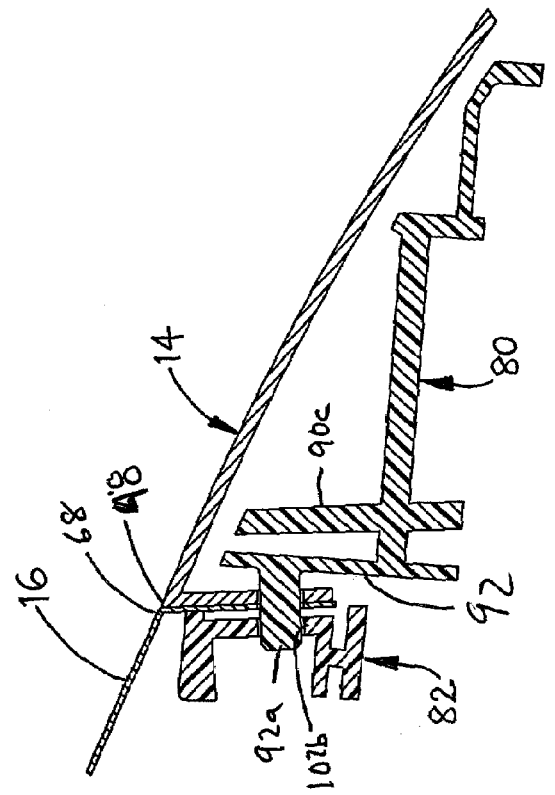
FIG. 21 is a simplified cross sectional view of the left end connection between the left end of the bumper fascia panel and the left fender body panel attached together by the mounting flange attachment arrangement as seen along section line 21-21 in FIG. 12.
Figure 23:
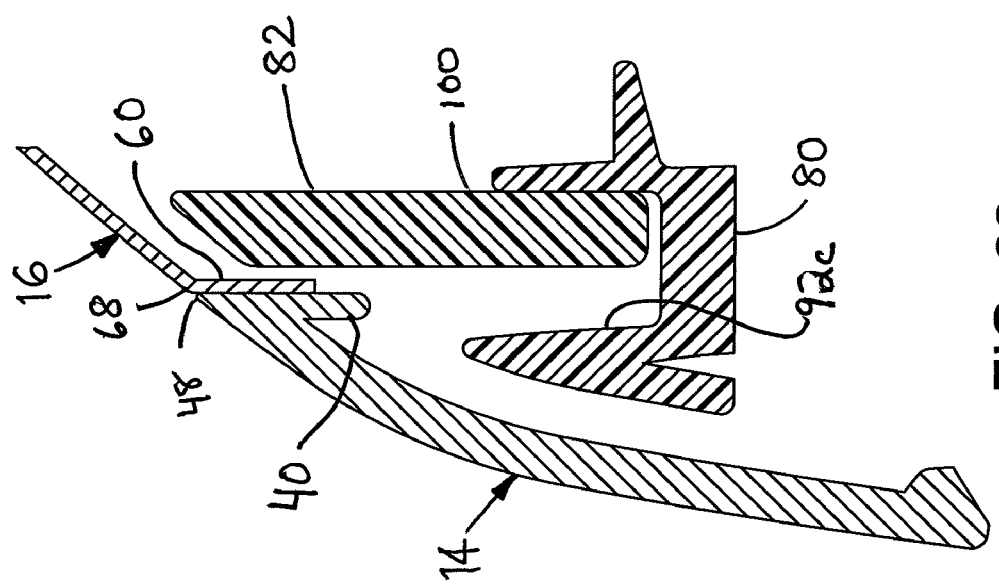
FIG. 23 is a simplified cross sectional view of the left end connection between the left end of the bumper fascia panel and the left fender body panel attached together by the mounting flange attachment arrangement as seen along section line 21-21 in FIG. 12.

Now referring to FIGS. 14 to 23, the mounting flange attachment arrangement 18 (see, FIGS. 16 to 20) basically includes a bumper fascia stiffening bracket 80 (see, FIG. 14), a fender attachment bracket 82 (see, FIG. 15) and a bolt 84 (see, FIG. 16). The bumper fascia stiffening bracket 80 basically constitutes a first fastening member that overlies the bumper fascia mounting flange 40. The fender attachment bracket 82 basically constitutes a second fastening member that overlies the fender mounting flange 60. The bolt 84 basically constitutes a part of a fastening element for coupling the bumper fascia stiffening bracket 80 and the fender attachment bracket 82 together with the bumper fascia mounting flange 40 and the fender mounting flange 62 being sandwiched between the bumper fascia stiffening bracket 80 and the fender attachment bracket 82. With this arrangement, the head (e.g., a tool engagement portion) of the bolt 84 is located on an inboard side of the mounting flange attachment arrangement 18 and with a center fastening axis A being angled in an inboard direction of the vehicle front end body structure 12. Thus, the mounting flange attachment arrangement 18 can be used in tight areas because the fastening axis A is angle relative to the mounting flanges 40 and 60 so that a tool can easily engage the head (e.g., a tool engagement portion) of the bolt 84 for tightening the bolt. In the illustrated embodiment, there are no threaded fasteners that extend through the mounting flanges 40 and 60 (i.e., no threaded fasteners that extend generally perpendicular to the mounting flanges 40 and 60).

The bumper fascia stiffening bracket 80 basically includes a bumper fascia support portion 90 and a flange fastening portion 92 extending from the bumper fascia support portion 90. The bumper fascia support portion 90 and the flange fastening portion 92 are preferably integrally formed together as a one-piece, unitary member from a lightweight, rigid material such as a plastic material or any other material that is well known in the automotive art.

Figure 12:
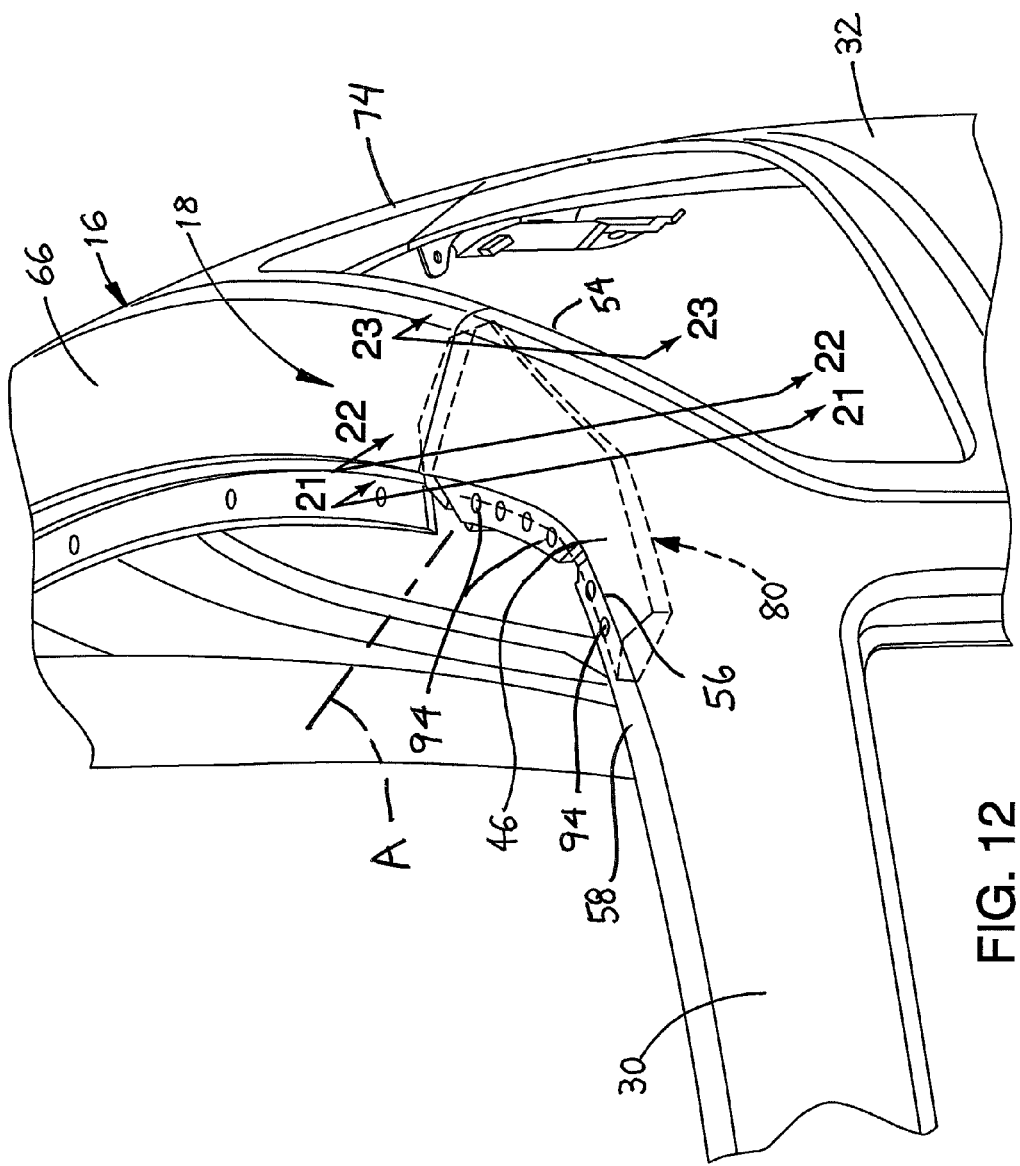
FIG. 12 is a partial front perspective view of the left end of the bumper fascia panel and the left fender body panel attached together by the mounting flange attachment arrangement (shown in broken lines)
Figure 13:
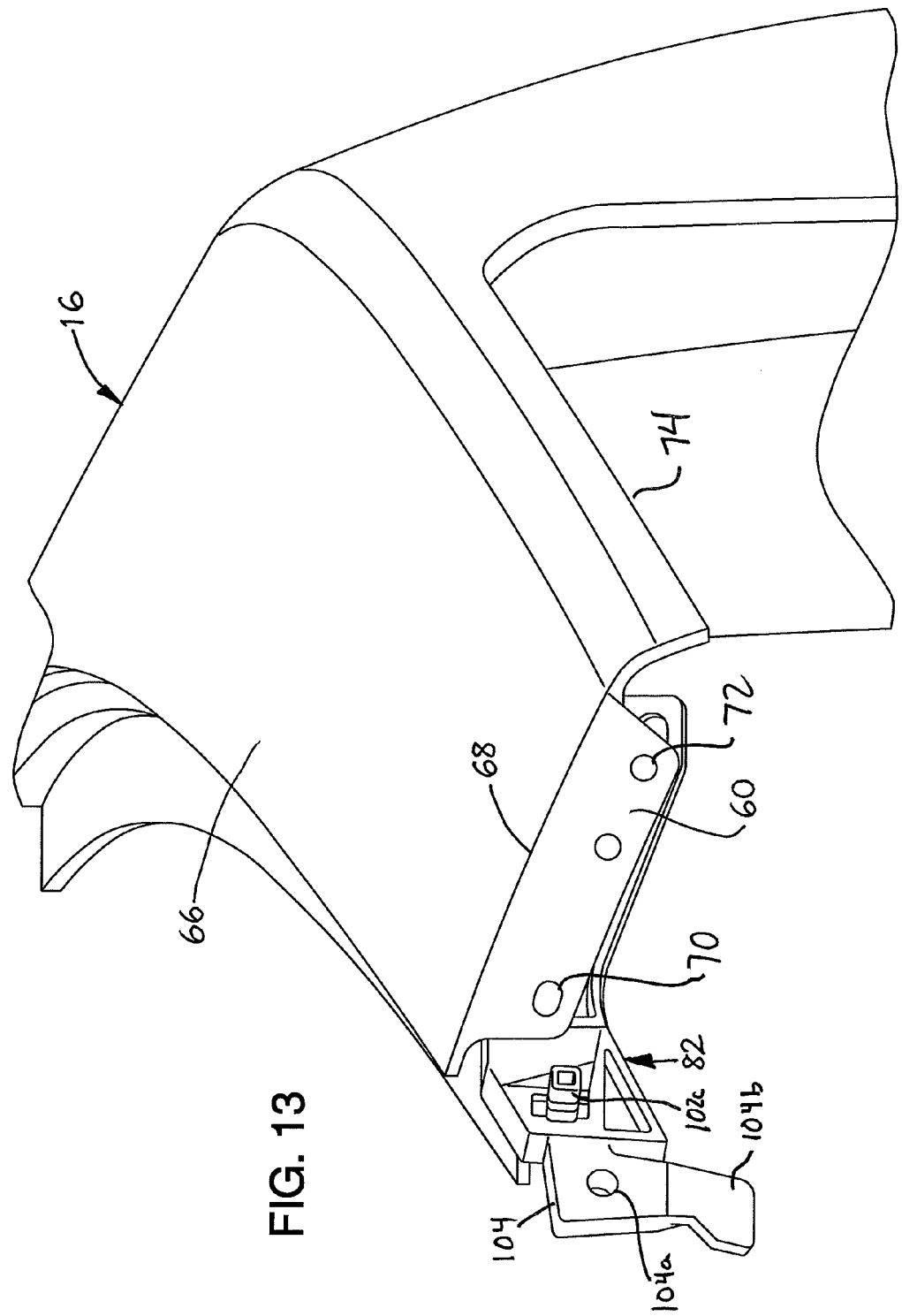
FIG. 13 is a front perspective view of the left fender body panel with the fender attachment bracket of the mounting flange attachment arrangement overlying the fender mount flange of the left fender body panel.
Figure 14:
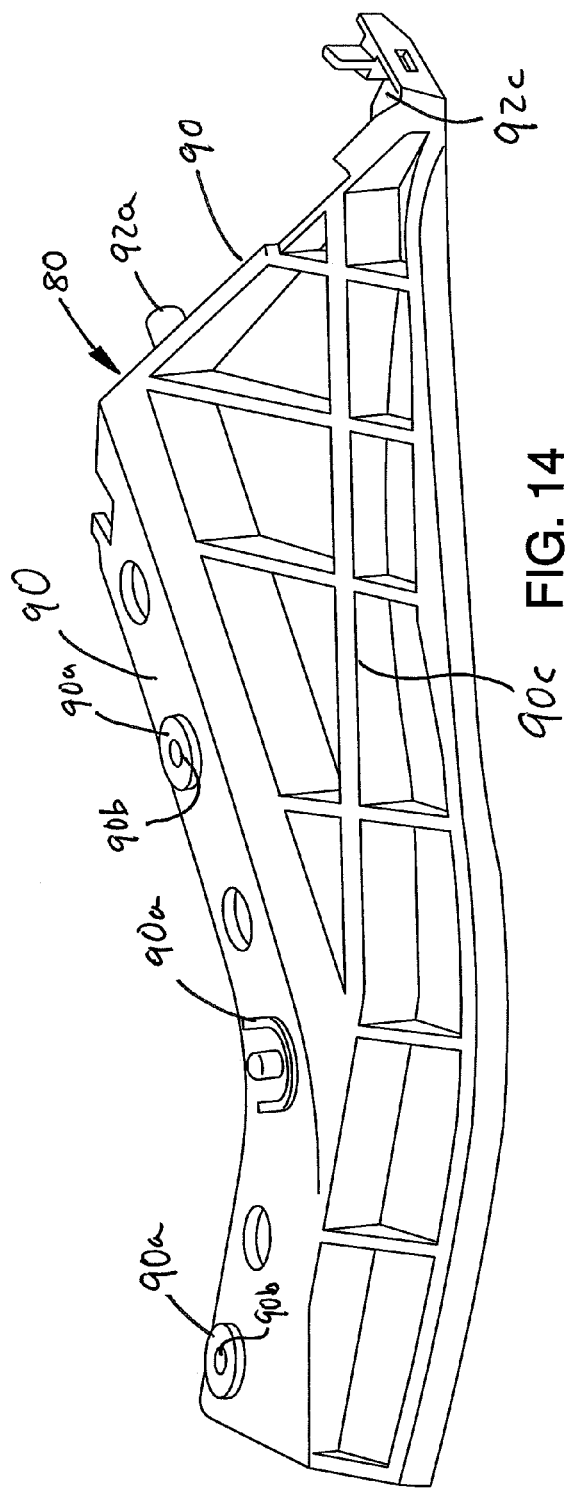
FIG. 14 is a front perspective view of the bumper fascia stiffening bracket of the mounting flange attachment arrangement.
Figure 15:
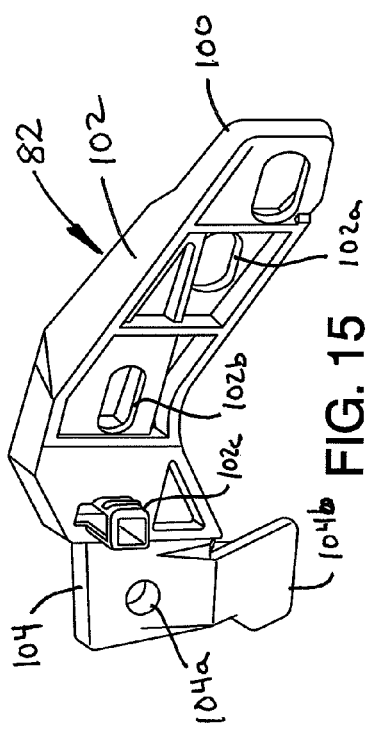
FIG. 15 is a front perspective view of the fender attachment bracket of the mounting flange attachment arrangement.

The bumper fascia support portion 90 extends from the flange fastening portion 92 in a frontward direction of the vehicle front end body structure 12, with a transverse width of the bumper fascia support portion 90 becoming progressively narrower in the frontward direction of the vehicle front end body structure 12. The bumper fascia support portion 90 has a convexly shaped surface that follows a contour of the interior bumper fascia surface 44 of the bumper fascia panel 14. The bumper fascia support portion 90 also contacts the interior bumper fascia surface 44 of the bent end portion 32 along the mounting flange 58 to aid in maintaining the shape of the bent end portion 32 and supporting the interior bumper fascia surface 44 of the bent end portion 32. Preferably, the bumper fascia support portion 90 is fixed to the bumper fascia support portion 90 by a plurality of rivets 94 as seen in FIGS. 6 and 12.

The bumper fascia support portion 90 includes a plurality of raised areas 90a around rivet openings 90b that directly contact the interior bumper fascia surface 44 of the bent end portion 32. The bumper fascia support portion 90 also includes a ribbed structure 90c including a plurality of diagonally crossing ribs that provide structural reinforcement/strength to the bumper fascia support portion 90. Also preferably, the bumper fascia support portion 90 has an inboard side that follows a contour of the exterior hood edge 58 of the bumper fascia panel 14. Thus, the bumper fascia support portion 90 provides backing support to the interior bumper fascia surface 44 of the bumper fascia panel 14.

The flange fastening portion 92 overlies the bumper fascia mounting flange 40. When the fender attachment bracket 82 is attached to the bumper fascia stiffening bracket 80 using the bolt 84, the flange fastening portion 92 aids in retaining the bumper fascia mounting flange 40 and the fender mounting flange 60 together with the exterior abutment edge 48 mating with the exterior abutment edge 68 to align the exterior bumper fascia surface 46 with the exterior fender surface 66.

The flange fastening portion 92 includes at least one locating pin 92a, a plurality of contact ribs 92b, an attachment bracket receiving recess 92c, and a detent receiving bore 92d. The locating pin 92a extends through the mounting hole 50 of the upper bumper fascia mounting flange 40 and through the mounting hole 60 of the upper fender mounting flange 60. The contact ribs 92b directly contact the upper bumper fascia mounting flange 40 to apply a clamping force against the upper bumper fascia mounting flange 40 when the bolt 84 is fully tightened. The attachment bracket receiving recess 92c supports an outboard end of the fender attachment bracket 82 when the fender attachment bracket 82 is attached to the bumper fascia stiffening bracket 80. The detent receiving bore 92d forms part of a snap-fit connection between the bumper fascia stiffening bracket 80 and the fender attachment bracket 82.

A nut 96 is installed in a recess of the bumper fascia stiffening bracket 80 for threadedly receiving the threaded shaft of the bolt 84. The nut 96 is arranged so that the center fastening axis A is angled in an inboard direction of the vehicle front end body structure 12 with respect to the surface of flange fastening portion 92. The nut 96 and the bolt 84 form a fastening element that fixedly connects the fender attachment bracket 82 and the bumper fascia stiffening bracket 80 together to retain the bumper fascia mounting flange 40 and the fender mounting flange 60 between the bumper fascia stiffening bracket 80 and the fender attachment bracket 82.

The fender attachment bracket 82 basically includes an inboard end 100, an intermediate flange fastening portion 102 and an outboard end 104. The fender attachment bracket 82 is preferably integrally formed together as a one-piece, unitary member from a lightweight, rigid material such as a plastic material or any other material that is well known in the automotive art. The fender attachment bracket 82 overlies the fender mounting flange 60 with the bumper fascia mounting flange 40 and the fender mounting flange 60 being sandwiched between the bumper fascia stiffening bracket 80 and the fender attachment bracket 82.

The inboard end 100 is disposed in the attachment bracket receiving recess 92c when the bumper fascia stiffening bracket 80 and the fender attachment bracket 82 are coupled together. Thus, the inboard end 100 is free of any type of fastener that requires a too for installation.

The intermediate flange fastening portion 102 has a pair of apertures 102a and 102b. The aperture 102a receive the locating projection 52 of the upper bumper fascia mounting flange 40, while the aperture 102b receive the locating pin 92a of the upper bumper fascia stiffening bracket 80. The intermediate flange fastening portion 102 also has a detent member 102c that forms part of the snap-fit connection between the bumper fascia stiffening bracket 80 and the fender attachment bracket 82. In particular, the detent member 102c is received in the detent receiving bore 92d of the bumper fascia stiffening bracket 80 via a snap-fit to initially retain the bumper fascia stiffening bracket 80 and the fender attachment bracket 82 together prior to installing the bolt 96. The apertures 102a and 102b are located outboard of the fastening element (i.e., the bolt 84 and the nut 96) and the snap-fit connection (i.e., the detent receiving bore 92d and the detent member 102c). The fastening element (i.e., the bolt 84 and the nut 96) does not pass through the bumper fascia mounting flange 60 and the fender mounting flange 70, and is oriented for easily installation of the bolt 84.

The outboard end 104 of the fender attachment bracket 82 has a fastener hole 104a and a handling tab 104b. The fastener hole 104a receives the shaft of the bolt 84. The handling tab 104b aids in installing the fender attachment bracket 82 by providing a gripping point.

Figure 7:
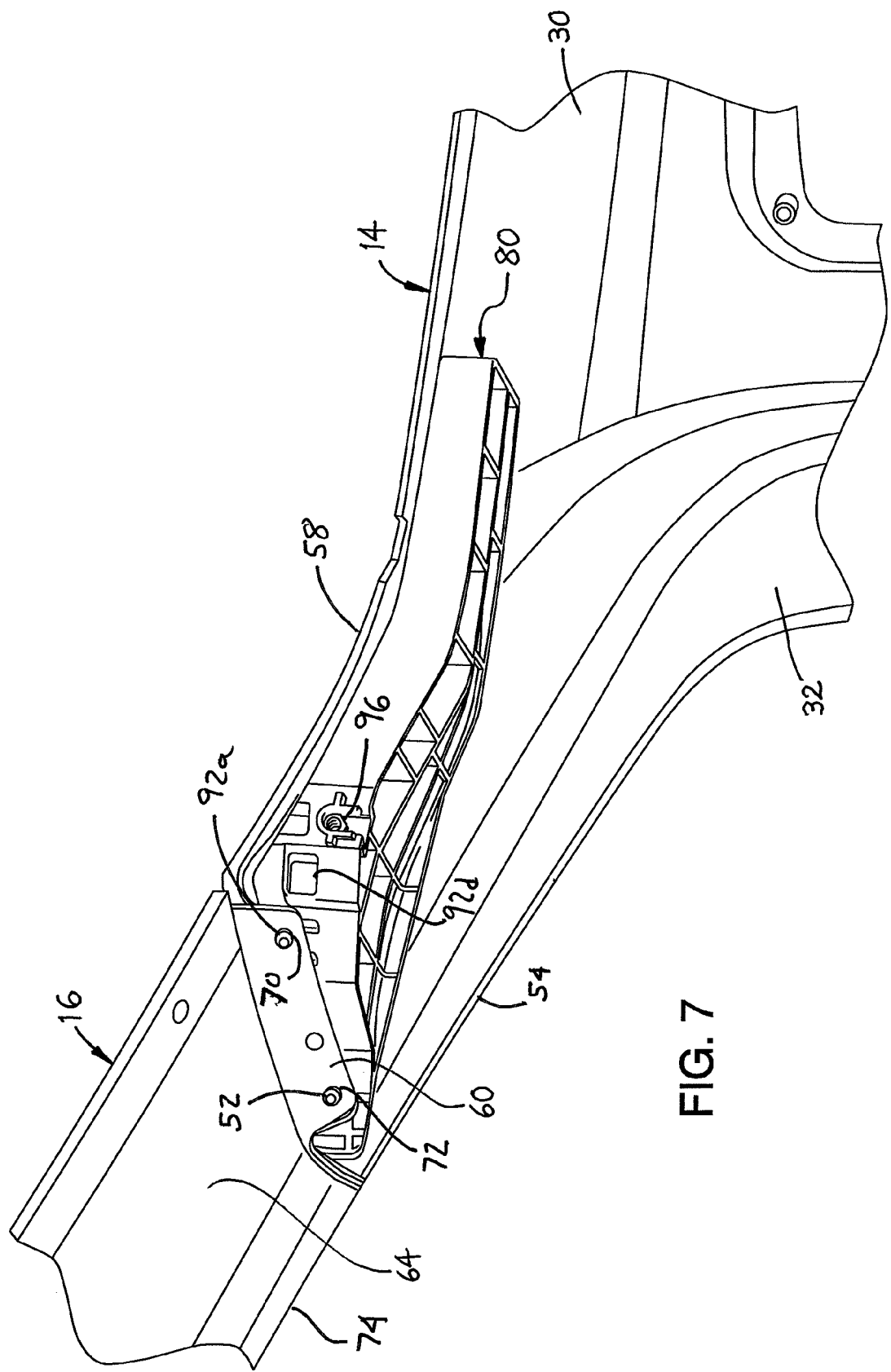
FIG. 7 is a partial rear perspective view of the left end of the bumper fascia panel of the vehicle body structure illustrated in FIGS. 4 and 5, with the bumper fascia stiffening bracket attached thereto and the left fender body panel aligned with the left end of the bumper fascia panel.
Figure 8:
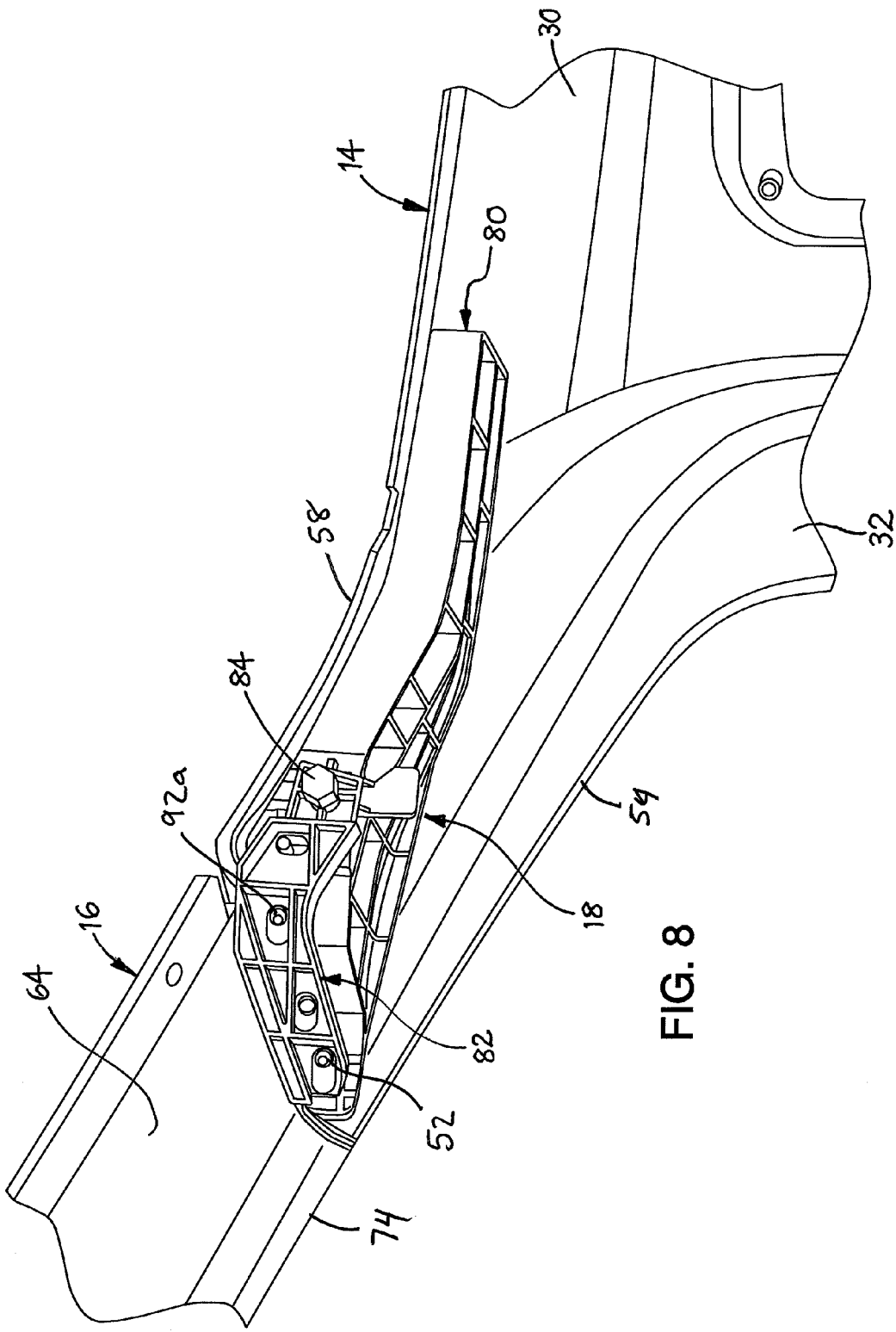
FIG. 8 is a partial rear perspective view of the left end of the bumper fascia panel and the left fender body panel attached together by the mounting flange attachment arrangement in accordance with the illustrated embodiment.
Figure 9:
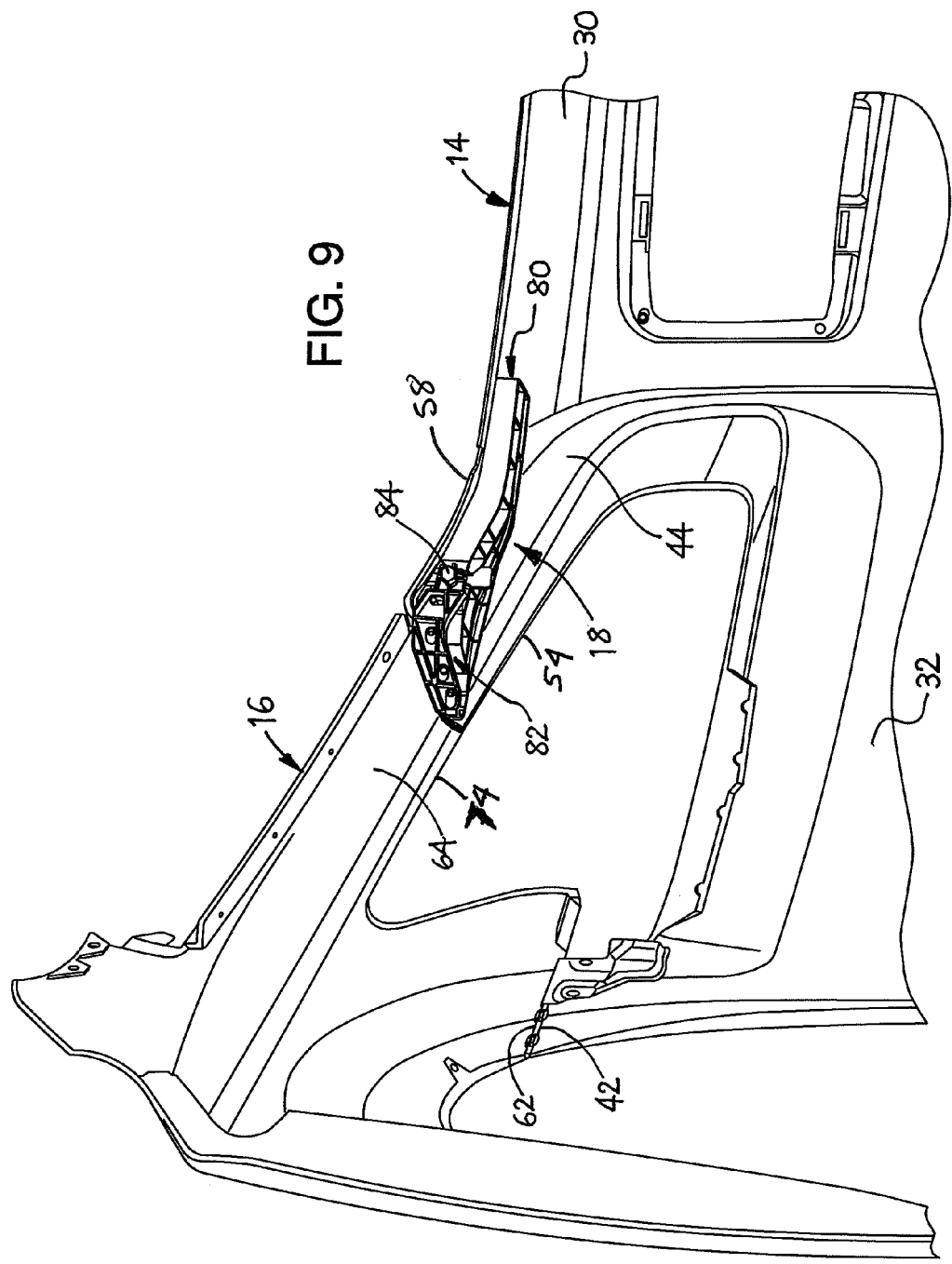
FIG. 9 is a partial rear perspective view of the left end of the bumper fascia panel and the left fender body panel attached together by the mounting flange attachment arrangement in accordance with the illustrated embodiment.
Figure 10:
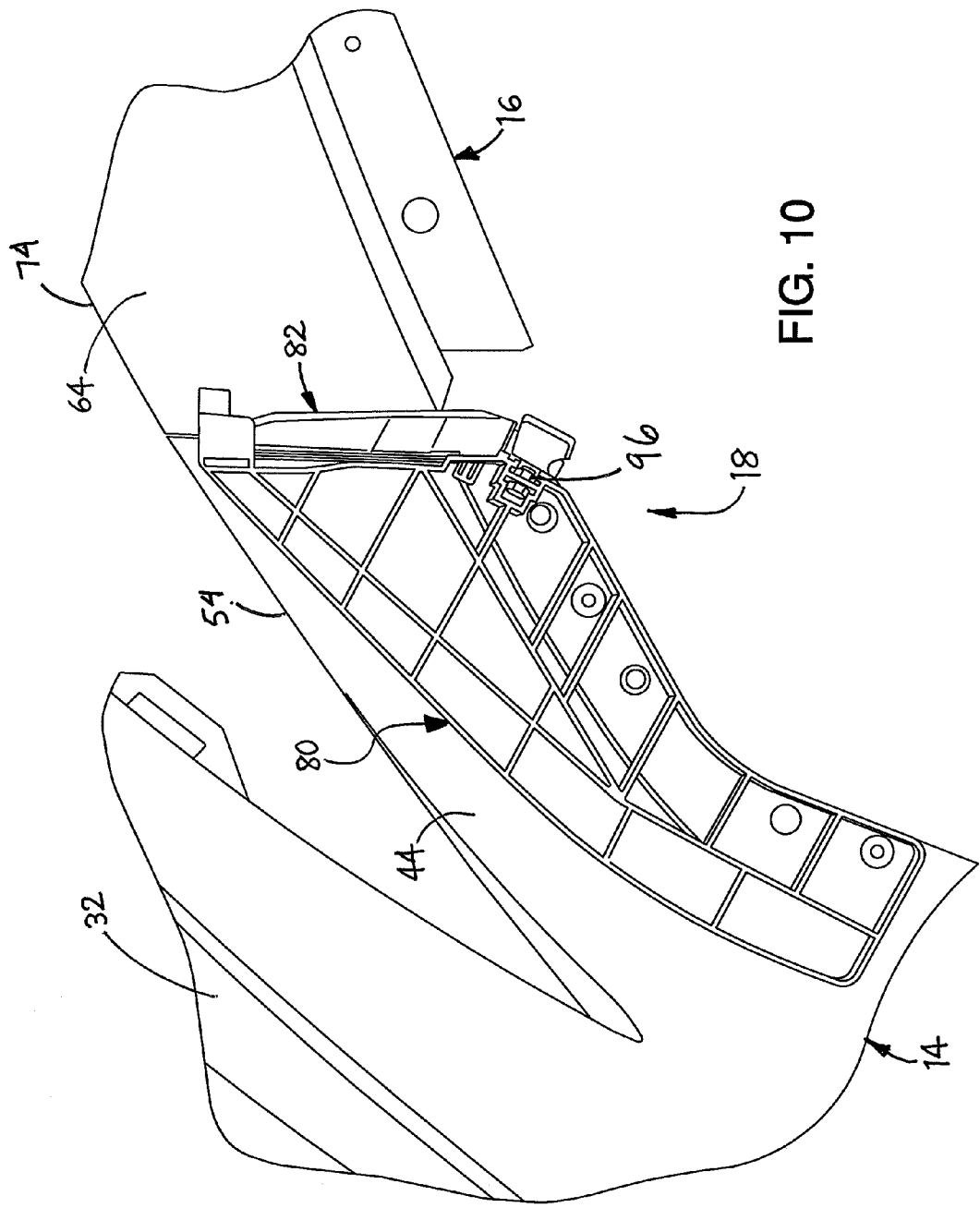
FIG. 10 is a partial bottom (underside) plan view of the left end of the bumper fascia panel and the left fender body panel attached together by the mounting flange attachment arrangement in accordance with the illustrated embodiment.
Figure 11:
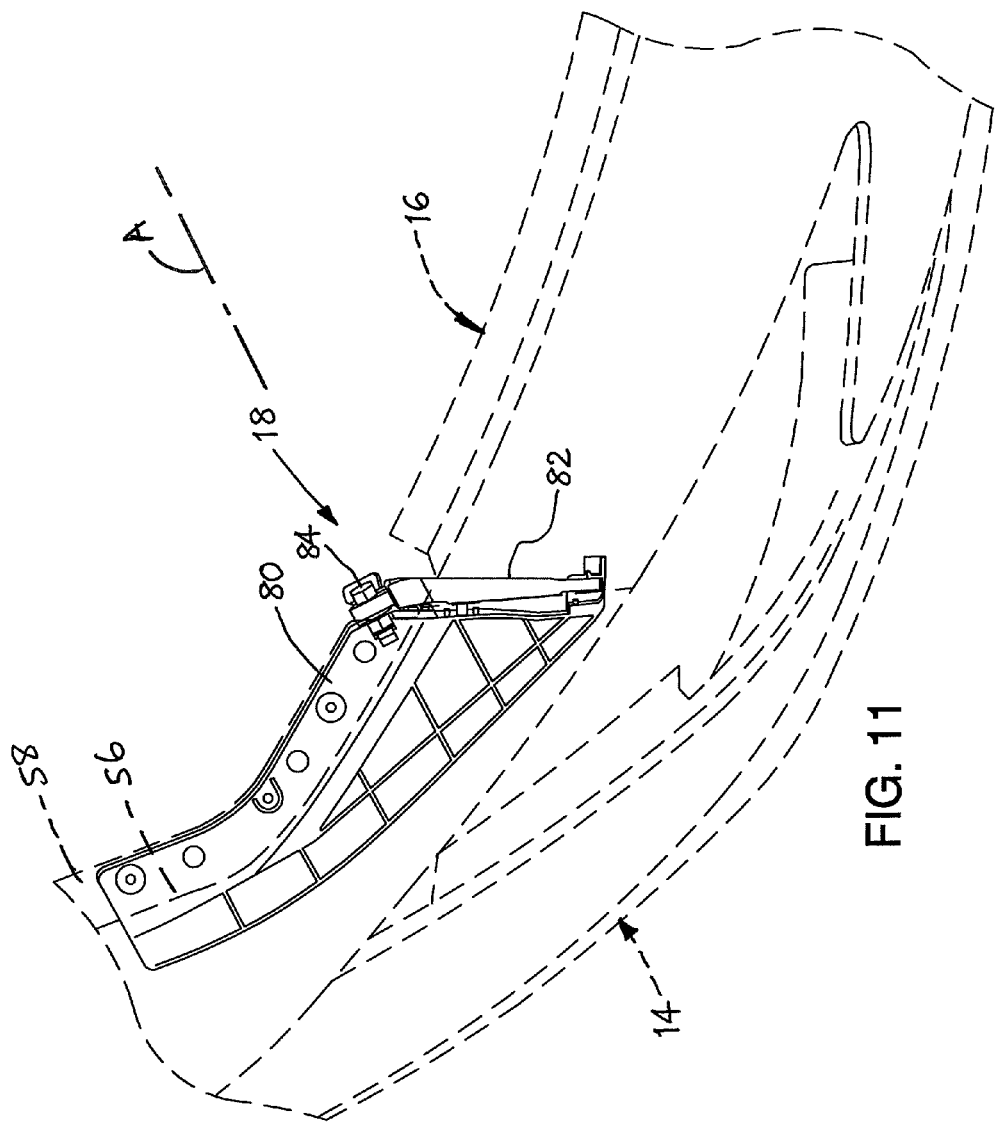
FIG. 11 is a partial top plan view of the mounting flange attachment arrangement with the left end of the bumper fascia panel and the left fender body panel attached shown in broken lines.

In assembly one of the fender body panels 16 to the bumper fascia panel 14, for example, the bumper fascia stiffening bracket 80 is first riveted to the bumper fascia panel 14 as seen in FIG. 6. Then, the fender body panel 16 aligned with the bumper fascia panel 14 using the locating projection 52 and the locating pin 92a as seen in FIG. 7. Next, the fender attachment bracket 82 is attached via the snap-fit connection (i.e., the detent receiving bore 92d and the detent member 102c). Finally, the bolt 84 is installed to sandwich the bumper fascia mounting flange 40 and the fender mounting flange 60 together between the bumper fascia stiffening bracket 80 and the fender attachment bracket 82 as seen in FIG. 8 and in the cross section of FIGS. 21 to 23. Thus, a single threaded fastener is used to secure the fender body panel 16 to the bumper fascia panel 14.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "outboard", inboard", "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention. The terms of degree such as "generally", "substantially", "about" and "approximately" as used herein mean a reasonable amount of deviation of the modified term such that the end result is not significantly changed. For example, two members that are angled less than ten degrees apart would be considered "generally perpendicular", but two members that are angled more than fifteen degrees apart would not be considered "generally perpendicular".

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle body structure comprising:
   a bumper fascia panel including an interior bumper fascia surface, an exterior bumper fascia surface and a bumper fascia mounting flange extending from the exterior bumper fascia surface at an angle to form a first exterior abutment edge between the exterior bumper fascia surface and a mounting surface of the bumper fascia mounting flange such that the first exterior abutment edge is visible from an exterior view of the vehicle body structure;
   a fender body panel including an exterior fender surface and a fender mounting flange extending from the exterior fender surface at an angle to form a second exterior abutment edge between the exterior fender surface and a mounting surface of the fender mounting flange such that the second exterior abutment edge is visible when installed; and
   a mounting flange attachment arrangement having a first fastening member overlying the bumper fascia mounting flange, a second fastening member overlying the fender mounting flange and a fastening element coupling the first and second fastening members together with the bumper fascia mounting flange and the fender mounting flange being sandwiched between the first and second fastening members, the fastening element having a tool engagement portion located on an inboard side of the mounting flange attachment and with a center fastening axis angled in an inboard direction of the vehicle body structure.

2. The vehicle body structure according to claim 1, wherein the bumper fascia panel has a first exterior head lamp edge extending from the first exterior abutment edge and the fender body panel has a second exterior head lamp edge extending from the second exterior abutment edge that are joined together to define at least an upper edge of a head lamp opening that is visible from the exterior view of the vehicle body structure.

3. The vehicle body structure according to claim 2, wherein the first and second exterior head lamp edges have opposite ends that meet together to completely encircle the head lamp opening.

4. The vehicle body structure according to claim 1, wherein the first fastening member includes a bumper fascia support portion providing backing support to the interior bumper fascia surface of the bumper fascia panel, and a flange fastening portion overlying the bumper fascia mounting flange.

5. The vehicle body structure according to claim 4, wherein the bumper fascia panel has an exterior hood edge extending from the first exterior abutment edge, and the bumper fascia stiffening bracket has an inboard side that follows a contour of the exterior hood edge of the bumper fascia panel.

6. The vehicle body structure according to claim 4, wherein the bumper fascia support portion extends from the flange fastening portion in a frontward direction of the vehicle body structure, with a transverse width of the bumper fascia support portion becoming progressively narrower in a frontward direction of the vehicle body structure.

7. The vehicle body structure according to claim 1, wherein
the first fastening member includes at least one locating pin disposed in an aperture of the bumper fascia mounting flange.

8. The vehicle body structure according to claim 7, wherein the locating pin is further disposed in an aperture of the fender mounting flange.

9. The vehicle body structure according to claim 1, further comprising
the fastening element includes a bolt and a nut with a head of the bolt being located on an inboard side of the first and second fastening members.

10. The vehicle body structure according to claim 9, wherein
the bolt does not pass through the bumper fascia mounting flange and the fender mounting flange.

11. The vehicle body structure according to claim 1, wherein
the first and second fastening members includes a snap-fit connection therebetween.

12. The vehicle body structure according to claim 11, wherein
the snap-fit connection is disposed on an outboard side of the fastening element.

13. The vehicle body structure according to claim 12, wherein
the mounting flange attachment arrangement does not include and threaded fasteners that are oriented generally perpendicularly to the bumper fascia mounting flange and the fender mounting flange.

14. The vehicle body structure according to claim 1, wherein
the first fastening member includes a recess with an outboard end of the attachment bracket disposed in the recess and an inboard end of the attachment bracket fastened to an inboard end of the bumper fascia stiffening bracket by the fastening element.

15. The vehicle body structure according to claim 1, wherein
the first and second fastening members includes a snap-fit connection therebetween, that is located on an outboard side of the fastening element.

16. The vehicle body structure according to claim 1, wherein
the attachment bracket has a handling tab protruding outwardly away from an area where the bumper fascia mounting flange and the fender mounting flange are sandwiched between the first and second fastening members.

\* \* \* \* \*